(12) United States Patent
Oh et al.

(10) Patent No.: US 8,161,524 B2
(45) Date of Patent: Apr. 17, 2012

(54) METHOD AND PORTABLE STORAGE DEVICE FOR ALLOCATING SECURE AREA IN INSECURE AREA

(75) Inventors: Yun-sang Oh, Seoul (KR); Sang-sin Jung, Seoul (KR); Moon-sang Kwon, Seoul (KR); Kyung-im Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1275 days.

(21) Appl. No.: 11/330,067

(22) Filed: Jan. 12, 2006

(65) Prior Publication Data

US 2006/0156036 A1    Jul. 13, 2006

Related U.S. Application Data

(60) Provisional application No. 60/643,150, filed on Jan. 13, 2005.

(30) Foreign Application Priority Data

May 20, 2005 (KR) .................. 10-2005-0042622

(51) Int. Cl.
*G06F 21/00* (2006.01)
(52) U.S. Cl. .............. 726/2; 726/34; 713/189; 713/193; 380/3; 711/171
(58) Field of Classification Search .......... 711/170–171; 713/193; 726/2
See application file for complete search history.

(56) References Cited

U.S. PATENT DOCUMENTS

| | | | |
|---|---|---|---|
| 5,617,537 A * | 4/1997 | Yamada et al. | 709/214 |
| 6,230,247 B1 * | 5/2001 | Cannon et al. | 711/171 |
| 6,480,941 B1 * | 11/2002 | Franke et al. | 711/153 |
| 6,654,754 B1 | 11/2003 | Knauft et al. | |
| 6,757,806 B2 * | 6/2004 | Shim | 711/203 |
| 7,069,445 B2 * | 6/2006 | Cheston et al. | 713/187 |
| 7,143,251 B1 * | 11/2006 | Patterson | 711/162 |
| RE40,405 E * | 6/2008 | Schwartz et al. | 713/187 |
| 7,418,344 B2 * | 8/2008 | Holtzman et al. | 701/301 |
| 7,653,777 B2 * | 1/2010 | Tan et al. | 711/103 |
| 8,045,706 B2 * | 10/2011 | Liu | 380/30 |

(Continued)

FOREIGN PATENT DOCUMENTS

CN     1316087 A     10/2001

(Continued)

OTHER PUBLICATIONS

Griswold, R. , Storage topologies, Computer, Dec. 2002, vol. 35, Issue: 12, on pp. 56-63.*

(Continued)

*Primary Examiner* — Taghi Arani
*Assistant Examiner* — Morshed Mehedi
(74) *Attorney, Agent, or Firm* — Sughrue Mion, PLLC

(57) ABSTRACT

A method for extending a secure area in a portable storage device and the portable storage device therefore are provided. The method includes allocating a secure area for storing data to be received within an insecure area, sending position information regarding the secure area allocated within the insecure area to a host device, receiving the position information and data to be stored in the secure area from a secure application of the host device, and encrypting and storing the data in the insecure area based on the position information.

20 Claims, 8 Drawing Sheets

U.S. PATENT DOCUMENTS

| | | | |
|---|---|---|---|
| 2001/0010045 A1 | 7/2001 | Stefik et al. | |
| 2002/0013772 A1 | 1/2002 | Peinado | |
| 2002/0026424 A1 | 2/2002 | Akashi | |
| 2002/0029199 A1 | 3/2002 | Go et al. | |
| 2002/0029347 A1 | 3/2002 | Edelman | |
| 2003/0028699 A1* | 2/2003 | Holtzman et al. | 710/301 |
| 2003/0046541 A1 | 3/2003 | Gerdes et al. | |
| 2003/0076957 A1 | 4/2003 | Asokan et al. | |
| 2003/0126086 A1 | 7/2003 | Safadi | |
| 2003/0200458 A1 | 10/2003 | Hori et al. | |
| 2003/0221103 A1* | 11/2003 | Hirota et al. | 713/172 |
| 2004/0003262 A1* | 1/2004 | England et al. | 713/189 |
| 2004/0064692 A1 | 4/2004 | Kahn et al. | |
| 2004/0068631 A1* | 4/2004 | Ukeda et al. | 711/163 |
| 2004/0103288 A1* | 5/2004 | Ziv et al. | 713/185 |
| 2004/0139315 A1 | 7/2004 | Tokutani et al. | |
| 2004/0172561 A1 | 9/2004 | Iga | |
| 2004/0202024 A1 | 10/2004 | Shinagawa et al. | 365/185.29 |
| 2004/0249768 A1 | 12/2004 | Kontio et al. | |
| 2004/0250037 A1* | 12/2004 | Takemura et al. | 711/164 |
| 2005/0022025 A1 | 1/2005 | Hug | |
| 2005/0052924 A1* | 3/2005 | Nishizawa et al. | 365/222 |
| 2005/0138314 A1* | 6/2005 | Liang et al. | 711/163 |
| 2005/0235124 A1* | 10/2005 | Pomaranski et al. | 711/170 |
| 2005/0243355 A1 | 11/2005 | Foehr et al. | |
| 2006/0026338 A1* | 2/2006 | Ebara et al. | 711/103 |
| 2006/0059358 A1* | 3/2006 | Galal et al. | 713/181 |
| 2006/0126422 A1* | 6/2006 | Takagi et al. | 365/232 |
| 2008/0089517 A1* | 4/2008 | Bianco et al. | 380/259 |

FOREIGN PATENT DOCUMENTS

| | | | |
|---|---|---|---|
| CN | 1536529 A | 10/2004 | |
| CN | 1537270 A | 10/2004 | |
| CN | 1561025 A | 1/2005 | |
| JP | 2002-124927 A | 4/2002 | |
| JP | 2002-358241 A | 12/2002 | |
| JP | 2004-220546 A | 8/2004 | |
| JP | 2004-295353 A | 10/2004 | |
| KR | 10-2003-0044892 A | 6/2003 | |
| KR | 10-2005-0039522 A | 4/2005 | |
| KR | 10-2005-0039523 A | 4/2005 | |
| KR | 10-2006-0011760 A | 2/2006 | |
| WO | 00/74300 A1 | 12/2000 | |
| WO | 03/034428 A2 | 4/2003 | |
| WO | 2004/097605 A1 | 11/2004 | |

OTHER PUBLICATIONS

Agarwal et al. "Adaptive incremental checkpointing for massively parallel systems", Proceeding ICS '04 Proceedings of the 18th annual international conference on Supercomputing, ACM New York, NY, ISBN:1-58113-839-3.*

Third Office Action dated Jul. 16, 2010, issued by the State Intellectual Property Office of P.R. China in counterpart Chinese Application No. 200680002173.0.

Canadian Office Action issued Feb. 8, 2011 in counterpart Canadian Patent Application No. 2,592,871.

Smith, M., "Digital Rights Management & Protecting the Digital Media Value Chain", Oct. 2004, pp. 187-191, ACM, College Park, Maryland, USA.

Derfler, F. et al., "How Networks Work", Bestseller Edition, 1996, all pages, Ziff-Davis Press, Emeryville, CA.

White, R. "How Computers Work", Millennium Edition, 1999, all pages, Que Corporation, Indianapolis, IN.

Gralla, P., "How the Internet Works", Millennium Edition, 1999, all pages, Que Corporation, Indianapolis, IN.

Muller, N., "Desktop Encyclopedia of the Internet", 1999, all pages, Artech House, Inc., Norwood, MA.

Matsuyama, K., et al., "Distributed Digital-Ticket Management for Rights Trading System", Proceedings of the 1st ACM Conference on Electronic Commerce, 1999, pp. 110-118.

White, R., "How Computers Work", Sixth Edition, 2002, chapter 9, Que Corporation, Indianapolis, IN.

"E4M—Encryption for the Masses"—Published Feb. 4, 2000 as per Wayback Engine, retreived from internet <http://web.archive.org/web/20000204210550/http://www.e4m.net/main.html>, p. 1-2.

* cited by examiner

| DATA IDENTIFIER | HASH VALUE OF FILE POSITION | FILE POSITION |
|---|---|---|
| SecureData_1 | 0xFF253 | 0x195 |
| SecureData_2 | 0xFF347 | 0x841 |
| ... | | |

METHOD AND PORTABLE STORAGE DEVICE FOR ALLOCATING SECURE AREA IN INSECURE AREA

CROSS-REFERENCE TO RELATED APPLICATIONS

This application claims priority from Korean Patent Application No. 10-2005-0042622 filed on May 20, 2005 in the Korean Intellectual Property Office, and U.S. Provisional Patent Application No. 60/643,150 filed on Jan. 13, 2005 in the United States Patent and Trademark Office, the disclosures of which are incorporated herein by reference in their entirety.

BACKGROUND OF THE INVENTION

1. Field of the Invention

The present invention relates to a portable storage device, and more particularly, to a method for extending a secure area in a portable storage device and the portable storage device therefore.

2. Description of the Related Art

A portable storage device is a removable device that stores and moves data of diverse digital devices such as mobile phones, computers, and digital cameras. The portable storage device includes a section for storing data and a section for performing operations and controls. A multimedia card (MMC) is a portable storage device that stores multimedia data to be used in diverse digital devices, exceeding the limits of conventional hard disks and compact discs. In addition, the MMC includes an operating section that is not present in conventional storage media, so that the MMC can perform control, encryption, and authentication in addition to storing data. As a result, the MMC is appropriate for storing a large amount of diverse multimedia data. Recently, a secure MMC for achieving security and protection of copyright in storage and transport of digital content has been developed by adding a security feature to the MMC, and therefore, protection of digital content has become possible. As the concept of digital rights management (DRM) on digital content is introduced, a security feature and an encryption feature for a rights object is needed and necessity of a portable storage device providing both of the security and encryption features arises. Hereinafter, digital devices such as digital cameras, mobile phones, computers, and digital camcorders are referred to as host devices.

A portable storage device includes a secure area to protect stored data and prevent an unauthorized user or application from accessing or changing data. FIG. 1 illustrates the structure of a conventional portable storage device 10. The conventional portable storage device 10 includes a system area, 20, a secure area 30, and an insecure area 40. The system area 20 stores system information, version information, etc. The secure area 30 is formatted in a special file system and the insecure area 40 is formatted in a normal file system.

Conventionally, the size of a secure area is fixed and cannot be changed. As a result, when the amount of secure data to be stored in the secure area is large, all of the secure data may not be stored in the secure area. To overcome the limit of the secure area having the fixed size, the size of the secure area has been changed through formatting. For this operation, a storage section of a portable storage device is divided into a secure area and an insecure area. The secure area is formatted in a special file system to provide a security feature and the insecure area is formatted in a normal file system such as File Allocation Table (FAT) 16 or a New Technology File System (NTFS). Reformatting is performed to change the size of the secure area.

However, since formatting needs to be performed before the size of the secure area is changed, data needs to be backed up before the formatting and to be copied or moved to the portable storage device after the formatting.

Therefore, development of a method of extending a secure area without a data backup procedure and a portable storage device therefor is desired.

SUMMARY OF THE INVENTION

The present invention provides a method and a portable storage device for easily extending a secure area in the portable storage device.

The present invention also provides a method and portable storage device for allocating a secure area in an insecure area to protect data in the secure area without limit in the size of the secure area.

According to an aspect of the present invention, there is provided a method of allocating a secure area in an insecure area of a portable storage device. The method includes allocating a secure area for storing data to be received within an insecure area; sending position information regarding the secure area allocated within the insecure area to a host device; receiving the position information and data to be stored in the secure area from a secure application of the host device; and encrypting and storing the data in the insecure area based on the position information.

According to another aspect of the present invention, there is provided a method of allocating a secure area in an insecure area of a portable storage device, the method including receiving data to be stored in the secure area from a secure application of a host device, securing the secure area for storing the data within the insecure area and encrypting and storing the data in the secure area, and sending a result of storing the data to the host.

According to still another aspect of the present invention, there is provided a portable storage device for allocating a secure area in an insecure area, the portable storage device including a storage section comprising an insecure area and a secure area, a transmitter sending position information regarding the secure area of the storage section to a host device, a receiver receiving the position information and data to be stored in the secure area from the host device, and a secure application encrypting and storing the data in the storage section based on the position information.

BRIEF DESCRIPTION OF THE DRAWINGS

The above and other aspects of the present invention will become more apparent by describing in detail exemplary embodiments thereof with reference to the attached drawings in which:

FIG. 4 illustrates the structure of a mapping table existing in a portable storage device, according to an exemplary embodiment of the present invention;

DETAILED DESCRIPTION OF EXEMPLARY EMBODIMENTS OF THE INVENTION

Figure 1:
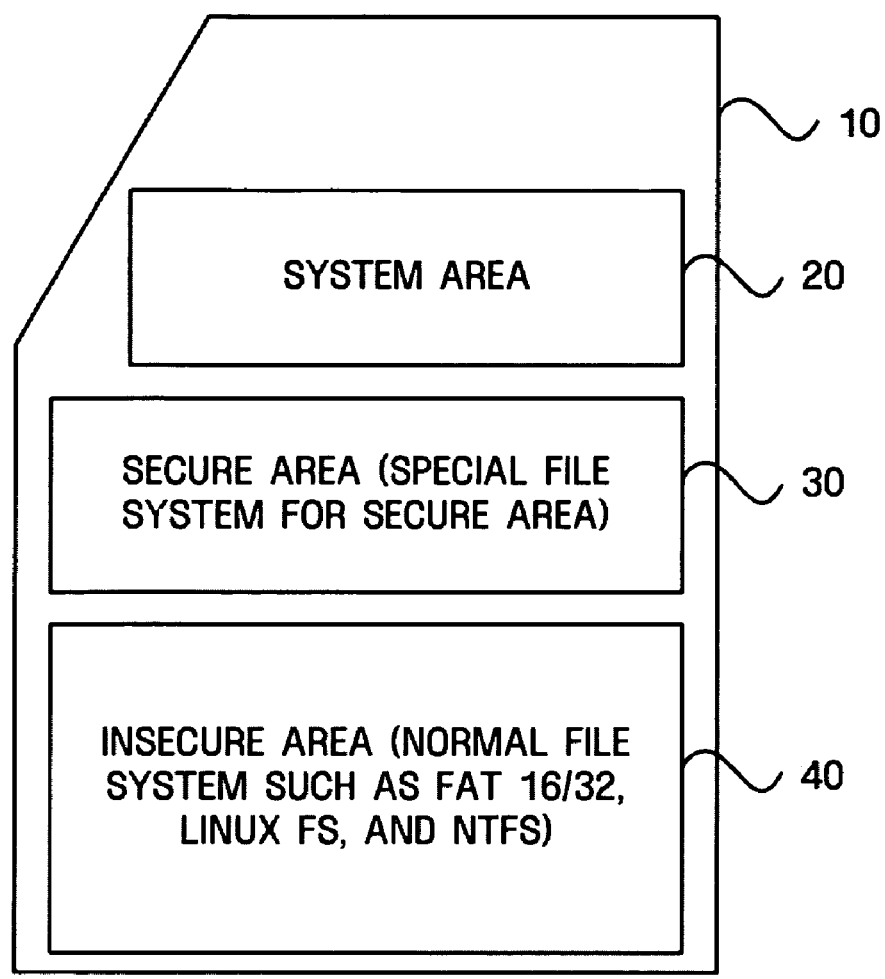
FIG. 1 illustrates the structure of a conventional portable storage device.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

A method of allocating a secure area in an insecure area of a portable storage device and a portable storage device providing the method according the present invention will be described hereinafter with reference to flowchart illustrations of methods according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
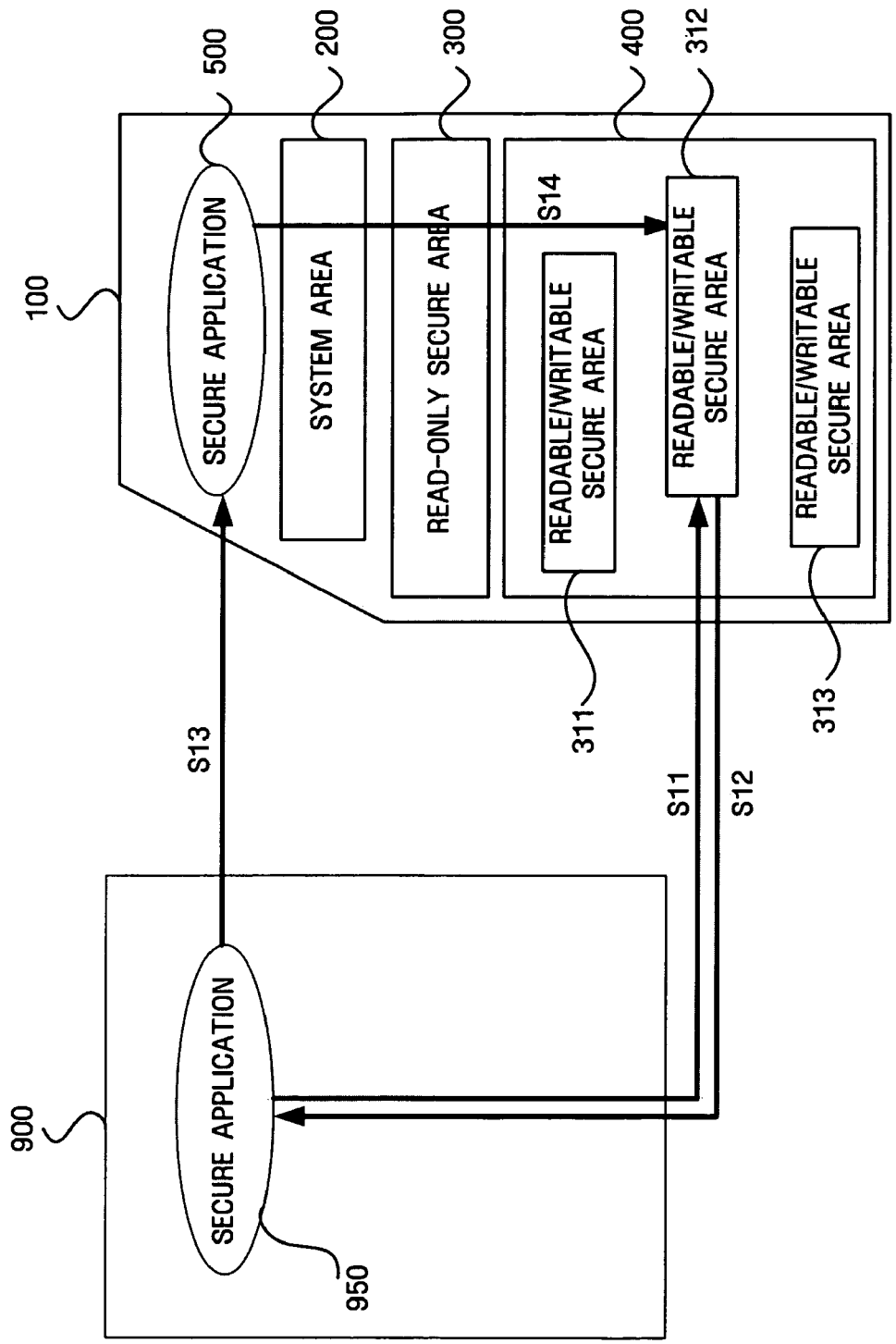
FIG. 2 illustrates the structure of a portable storage device having an insecure area including a secure area, according to an exemplary embodiment of the present invention.

FIG. 2 illustrates the structure of a portable storage device 100 having an insecure area 400 including a secure area, according to an exemplary embodiment of the present invention. The portable storage device 100 is connected to a host device 900. The host device 900 may be a notebook computer, a mobile phone, a personal digital assistant (PDA), or an MP3 player and communicates with the portable storage device 100 through a secure application 950. The portable storage device 100 includes a secure application 500, a system area 200, a read-only secure area 300, and an insecure area 400. The system area 200 stores information on a system. The read-only secure area 300 can by accessed by only an application that has been authenticated by the portable storage device 100. Data related with security is usually stored in the read-only secure area 300 when the portable storage device 100 is manufactured or before it is on the market. The data cannot be changed or removed.

Data can be freely stored in and read from the insecure area 400. The insecure area 400 includes a plurality of readable/writable secure areas 311, 312, and 313. Accordingly, a secure area can be created in the insecure area 400 and data can be stored in the secure area, through the secure application 500. The data stored in the secure area in the insecure area 400 can be read through the secure application 500.

Operations performed to store security data in and read security data from the insecure area 400 according to an exemplary embodiment of the present invention will be described with reference to FIG. 2. In operation S11, the host device 900 secures space in the insecure area 400 of the portable storage device 100 through the secure application 950 according to the mechanism of a file system of the insecure area 400. This operation is the same as an operation of storing data in a File Allocation Table (FAT) 16/32. The secured space becomes a readable/writable secure area. In operation S12, the secure application 950 receives an address value of the secured space.

In operation S13, the secure application 950 of the host device 900 sends the address value and data to be stored in a secure area to the secure application 500 of the portable storage device 100. The secure application 500 of the portable storage device 100 may include a table for mapping the address value of the secure area existing in the insecure area 400 to a relative address value that the secure application 500 can recognize. In operation S14, the secure application 500 stores the received data to a corresponding address. The data is protected through a protection technique such as encryption before being stored.

The data stored in the secure area secured in the insecure area 400 through operations S11 through S14 can be read, removed, or updated through the secure application 500.

The secure application 950 of the host device 900 sends a command to read, update, or remove data stored in the readable/writable secure area 312 together with an identification of the data. When the secure application 950 of the host device 900 is normally authenticated, the secure application 500 of the portable storage device 100 accesses the readable/writable secure area 312 having the identification and reads, updates, or removes the data in the readable/writable secure area 312. Since the stored data has been encrypted, decryption is performed when the data is read and then the read data is sent to the host device 900.

Figure 3:
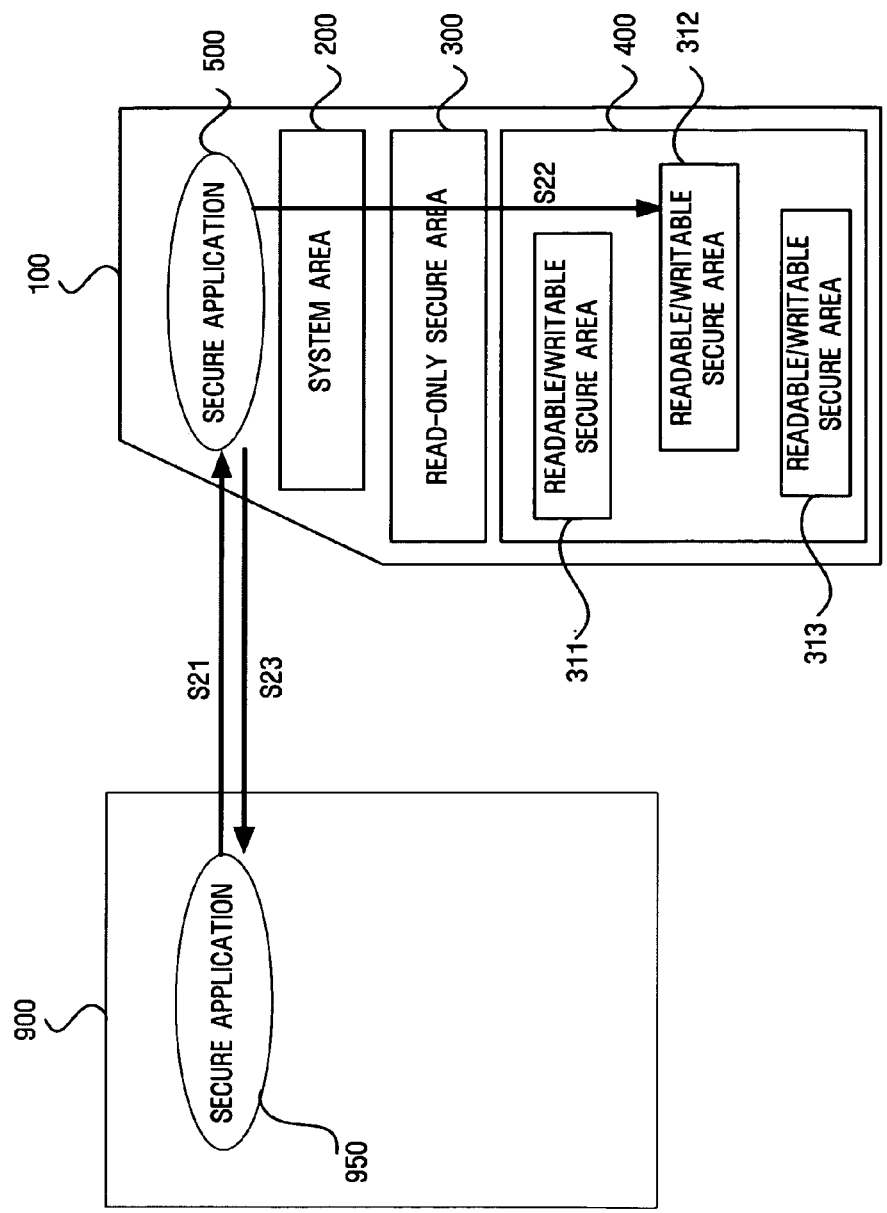
FIG. 3 illustrates a procedure of storing data in a secure area of a portable storage, according to an exemplary embodiment of the present invention.

Operations performed to store security data in the insecure area 400 according to another exemplary embodiment of the present invention will be described with reference to FIG. 3.

Operations of creating the secure area in the insecure area 400 are the same as those illustrated in FIG. 2. Unlike the operations illustrated in FIG. 2, the host device 900 sends data to be stored and information indicating that the data will be stored in a secure area to the portable storage device 100 in operation S21. The portable storage device 100 searches the insecure area 400 for space, e.g., the readable/writable secure area 312, in which the data can be stored and stores the received data in operation S22. The data is encrypted before being stored in the secure area. The portable storage device 100 informs the host device 900 that the data has been stored in the secure area in operation S23.

The data stored in the secure area created in the insecure area 400 through operations S21 through S23 can be read, removed, or updated through the secure application 500, as described above.

For the security of transmitted and received commands and data when the data is input into or output from a secure area created in the insecure area 400 as described with reference to FIGS. 2 and 3, the data and the commands may be encrypted using an encryption method or key agreed between the secure application 950 of the host device 900 and the secure application 500 of the portable storage device 100.

FIG. 4 illustrates the structure of a mapping table 510 existing in a portable storage device, according to an exemplary embodiment of the present invention. The mapping table 510 includes data identifier, a hash value of file position, and file position. The data identifier is needed by a host device accessing data stored in a secure area. When a particular application of the host device sends a data identifier, a secure application verifies whether the particular application has been authenticated. After the authentication of the particular application, a position where data indicated by the data identifier is stored is extracted from a file position item and the data stored in the secure area within an insecure area can be accessed based on the extracted position information. Since the data has been encrypted when stored in the secure area, decryption is needed to access the data and send it to the host device. External access to information on the file position is prohibited and the data is encrypted when stored in the secure area, so that the data in the secure area can be protected from external, unauthorized access.

A hash value is sent in the same manner as the file identification. The hash value hinders the host device from recognizing a physical position where the data is stored, thereby preventing the direct access of the host device. In FIG. 2, position information sent to the secure application 950 of the host device 900 may be a hash value. In this case, the secure application 950 of the host device 900 sends a hash value and data to be stored to the portable storage device 100. Then, the secure application 500 of the portable storage device 100 can obtain position information corresponding to the hash value from the mapping table 510.

Figure 5:
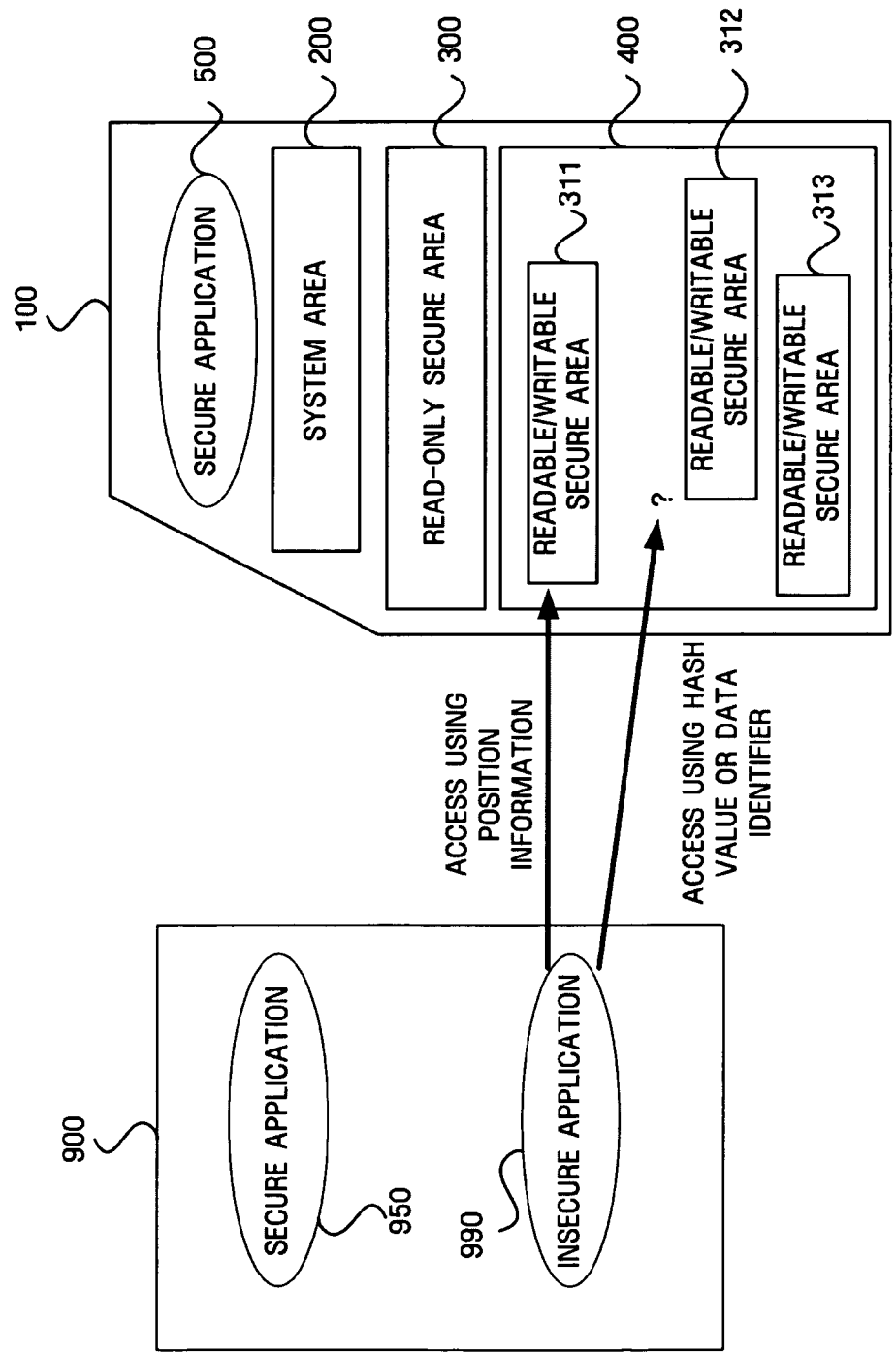
FIG. 5 illustrates a procedure of blocking an unauthorized access to the secure area, according to an exemplary embodiment of the present invention.

FIG. 5 illustrates a procedure of blocking an unauthorized access to the secure area, according to an exemplary embodiment of the present invention. An insecure application 990 may access data in the secure area 311, 312, or 313 without authentication. The insecure application 990 may access the secure area 311, 312, or 313 within the insecure area 400 randomly or by extracting position information. However, even if the insecure application 990 tries to access data in the readable/writable secure area 311 using the position information, since the data stored in the readable/writable secure area 311 has been encrypted, the insecure application 990 cannot read the data. As a result, the insecure application 990 cannot access the data stored in the readable/writable secure area 311 within the insecure area 400.

Unlikely, when the insecure application 990 tries to access data in the insecure area 400 using a data identifier stored in a secure area or a data identifier that the secure application 950 has received through the secure application 500 of the portable storage device 100, the insecure application 990 cannot recognize the position of the data and thus cannot access the data. Recognizing a data position using a hash value or data identifier is possible through the secure application 500 of the portable storage device 100. However, the insecure application 990 cannot communicate with the secure application 500 of the portable storage device 100, and therefore, it cannot access data in the readable/writable secure area 311, 312, or 313.

Figure 6:
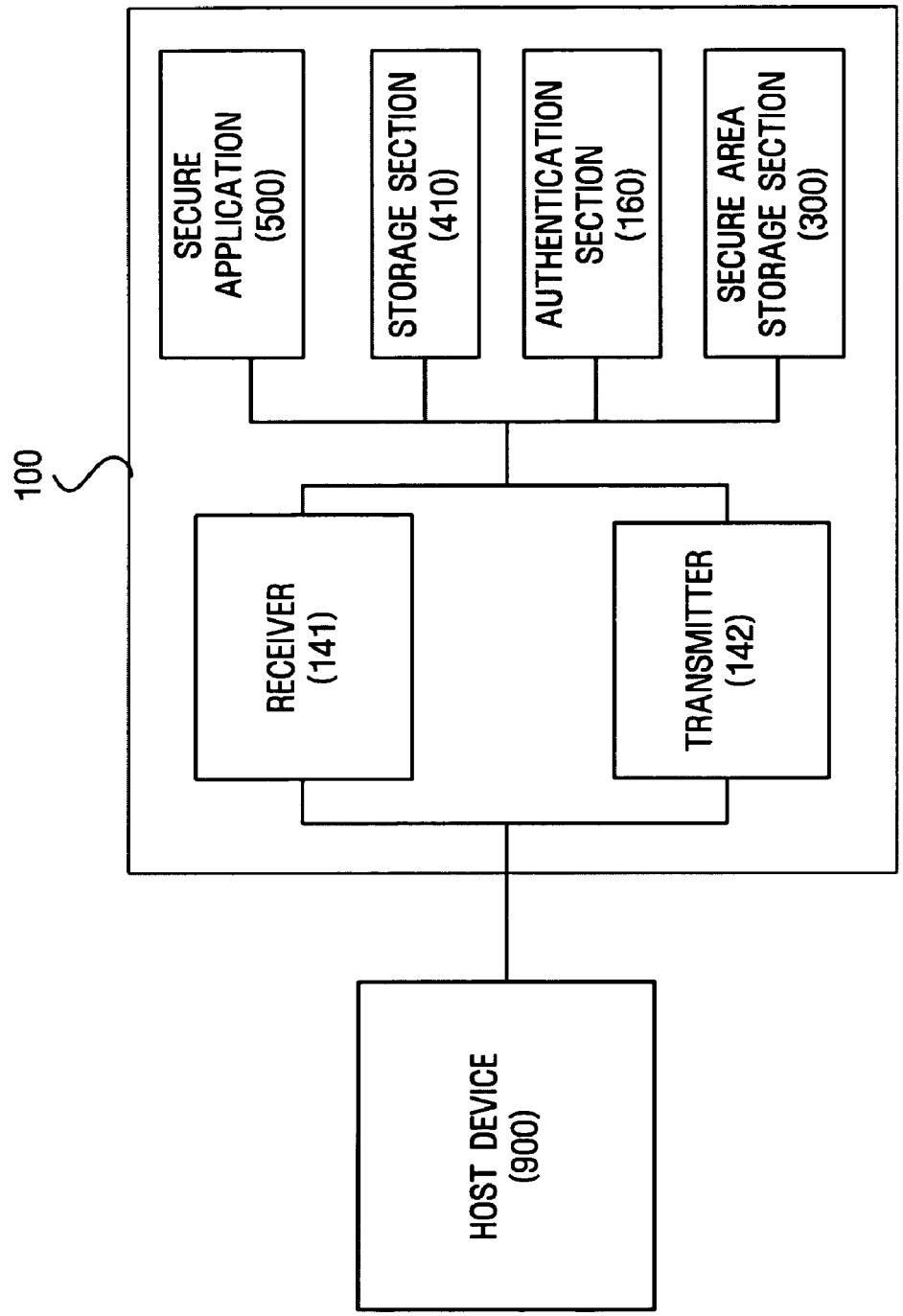
FIG. 6 is a functional block diagram of a portable storage device, according to an exemplary embodiment of the present invention.

FIG. 6 is a functional block diagram of a portable storage device, according to an exemplary embodiment of the present invention. The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executed one or more CPUs in a communication system.

The portable storage device 100 includes a receiver 141 and a transmitter 142 to receive and transmit data from and to the host device 900. A storage section 410 stores data in an insecure area and a secure area. As described above with reference to FIGS. 2 and 3, data to be stored in the secure area is encrypted. Since the storage section 410 stores both data for the insecure area and data for the secure area, data encrypted through the secure application 500 is stored in the secure area of the storage section 410. The secure application 500 stores data needed to be stored in the secure area in the storage section 410 and controls access to the data. The secure application 500 may keep security using the mapping table 510 illustrated in FIG. 4 and prohibit unauthorized access to the data by encrypting the data before storing it.

The secure application 500 can perform authentication with the host device 900 and can perform operations related with the authentication using authentication, encryption and decryption features provided by an authentication section 160. The authentication section 160 provides features for encryption and decryption using a symmetric key algorithm or an asymmetric key algorithm and generates a session key. The features provided by the authentication section 160 perform a procedure of identifying and authenticating the host device 900 when the secure application 500 communicates with the host device 900 via a wired or wireless connection. In addition, the authentication section 160 provides authentication, encryption and decryption features to transport data between the secure application 950 of the host device 900 and the secure application 500 of the portable storage device 100 using a secure channel or mode.

A secure area storage section 300 may be selectively provided. As described above with reference to FIGS. 2 and 3, when a secure area is positioned within an insecure area, read-only data may be separately stored in the secure area storage section 300. In addition, some readable/writable data may be stored in the secure area storage section 300. When no more space exists in the secure area storage section 300, space is secured in the insecure area of the storage section 410 and is used as a secure area. For example, the secure area storage section 300 may have a space of 50 Mbytes, the storage section 410 may have a space of 500 Mbytes, and the secure area storage section 300 may include both a read-only secure area and a readable/writable secure area. In this situation, when the secure area storage section 300 does not have empty space for storing data any more, a secure area may be secured in the storage section 410 and data may be stored therein.

A ratio between an insecure area and a secure area and how the insecure area and the secure area will be provided may be different according to exemplary embodiments, and the present invention is not restricted to the exemplary embodiments described in this specification.

Figure 7:
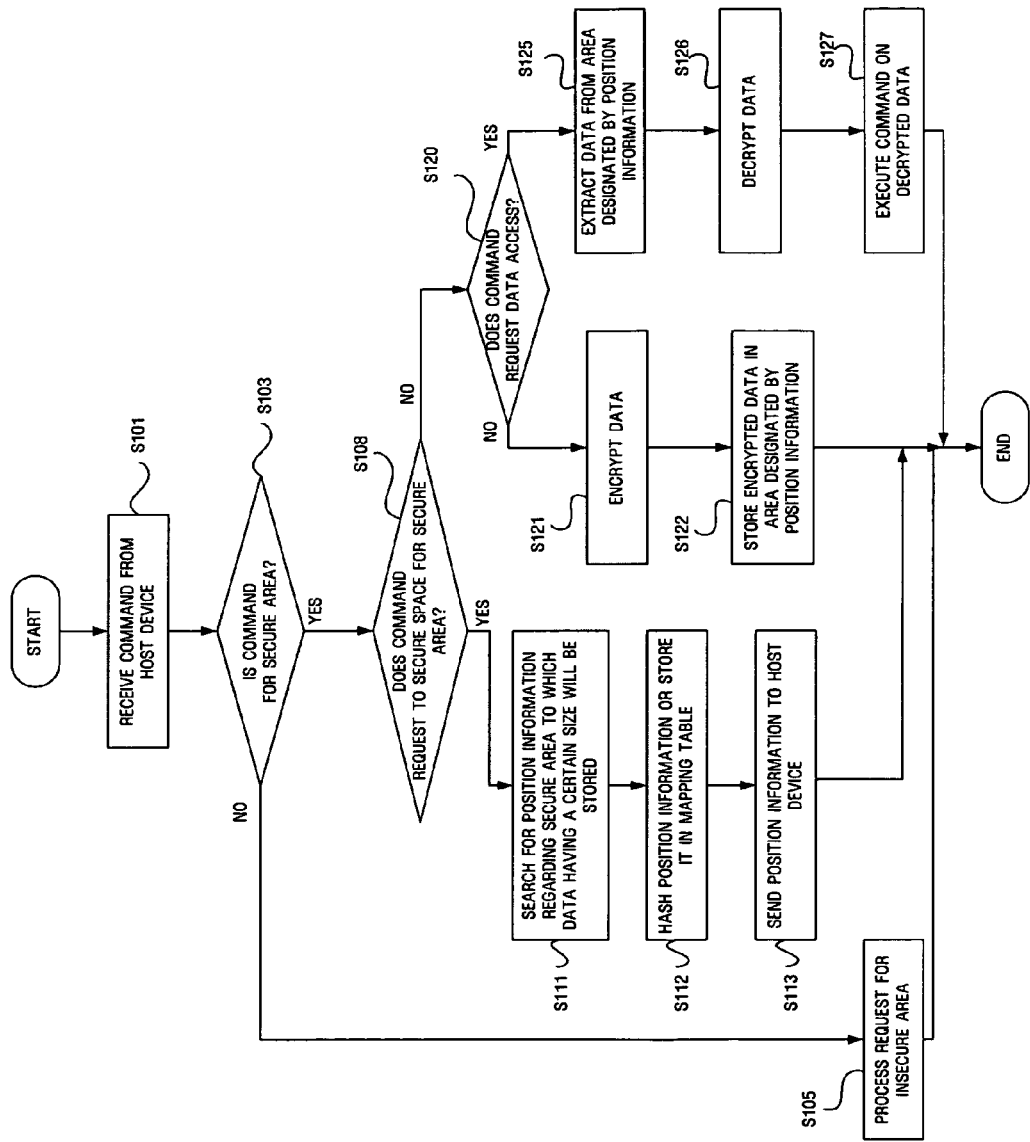
FIG. 7 is a flowchart of a method of storing and accessing data in a portable storage device, according to an exemplary embodiment of the present invention.

FIG. 7 is a flowchart of a method of storing and accessing data in a portable storage device, according to an exemplary embodiment of the present invention. The flowchart shown in FIG. 7 implements the operations described with reference to FIG. 2. In operation S101, a command is received from a host device. If it is determined that the command is not for a secure area in operation S103, a request for an insecure area is processed in operation S105 and the method ends. If it is determined that the command requests to secure a space to store data in the secure area in operation S108, a secure application searches the insecure area for position information regarding the secure area to which relevant data having a certain size will be stored in operation S111. The position information is hashed or stored in a mapping table in operation S112 in order to prevent an external, unauthorized user from directly accessing a corresponding position. The hashed position information or information for finding the position information in the mapping table is sent to the host device in operation S113.

When the command does not include information about data size, it is determined whether the command requests to access data in operation S120. It is determined that the command does not request data access when the host device received the position information in operation S113 sends the position information together with data to be stored in the corresponding position. Accordingly, the data received from the host device is encrypted in operation S121. The encrypted data is stored in an area corresponding to the received position information in operation S122. An actual position of a secure area to which the data will be stored can be obtained from the received position information referring to a hash table or the mapping table.

If it is determined that the command requests data access in operation S120, decryption needed to access data in a secure area will be performed. For the decryption, data is extracted from the secure area designated by position information in operation S125. Since the position information may have been changed using the hash table or the mapping table, an actual position of the secure area may be obtained using the hash table or the mapping table. The data extracted from the position is decrypted in operation S126. The command is executed on the data in operation S127.

To store or access data in a secure area, an authentication procedure may be added. The authentication procedure can be performed through a secure application within the host device.

Figure 8:
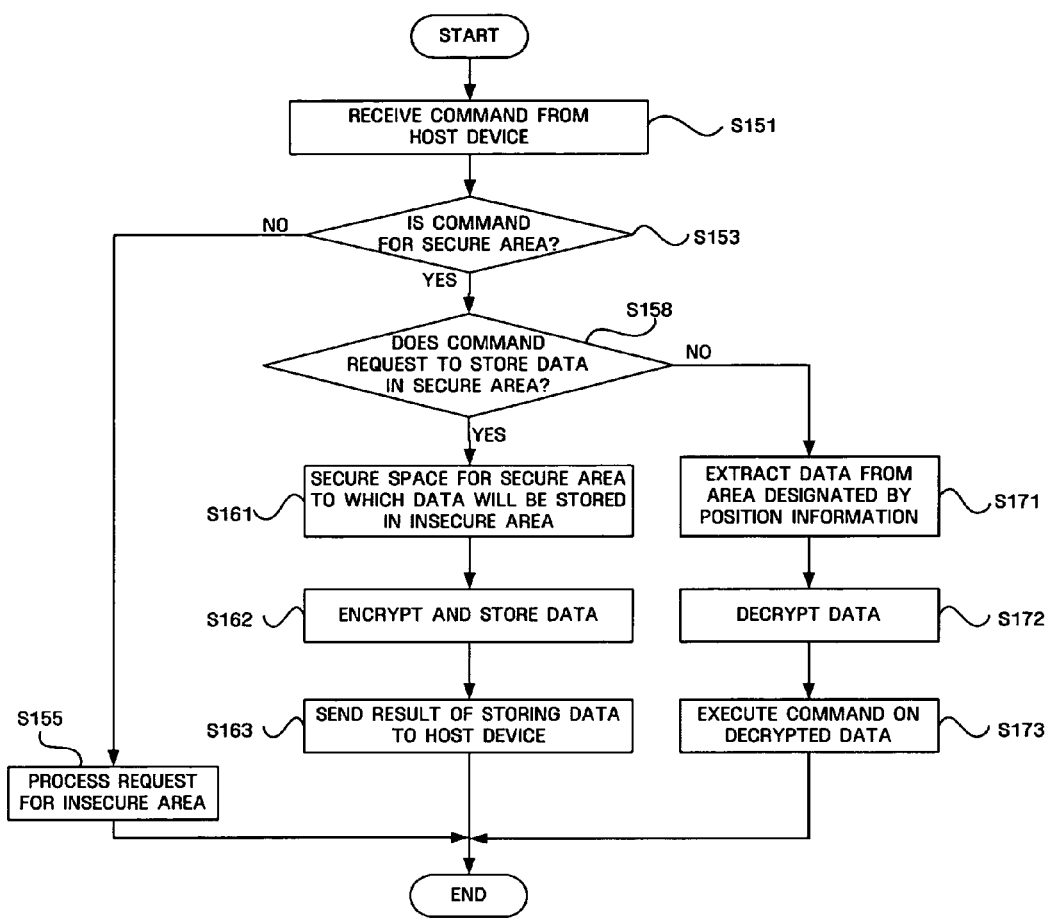
FIG. 8 is a flowchart of a method of storing and accessing data in a portable storage device, according to another exemplary embodiment of the present invention.

FIG. 8 is a flowchart of a method of storing and accessing data in a portable storage device, according to another exemplary embodiment of the present invention. The flowchart illustrated in FIG. 8 implements the operations described with reference to FIG. 3. In operation S151, a command is received from a host device. If it is determined that the command is not for a secure area in operation S153, a request for an insecure area is processed in operation S155 and the method ends. If it is determined that the command requests to store data in the secure area in operation S158, a secure application secures a space as the secure area within the insecure area in operation S161. The data is encrypted and stored in the space secured as the secure area in operation S162. A result of storing the data is sent to the host device in operation S163. The storing result may include position information regarding the secure area to which the data has been stored. When the position information is sent, it may be changed using a hash function or a mapping table in order to prevent an unauthorized application from directly accessing a corresponding position.

If it is determined that the command does not request to store data in operation S158, operations for accessing data will be performed. Data can be accessed using information regarding the data. When the information regarding the data includes position information, data in an area designated by the position information is extracted in operation S171. When the position information has been changed using the hash function or the mapping table, as described above, the secure area can be accessed using original position information. When the information regarding the data is not the position information but a data identifier, the position information can be identified using the mapping table 510 illustrated in FIG. 4. Data at a position corresponding to the position information is decrypted in operation S172. The command is executed on the decrypted data in operation S173.

To store or access data in a secure area, an authentication procedure may be added. The authentication procedure can be performed through a secure application within the host device.

According to the present invention, a secure area can be easily extended in a portable storage device.

In addition, data requiring security can be stored in an insecure area and the data stored in the insecure area can be protected from unauthorized access.

It will be apparent to those skilled in the art that various modifications and changes may be made thereto without departing from the scope and spirit of the invention. Therefore, it should be understood that the above exemplary embodiments are not restrictive but illustrative in all aspects. The scope of the present invention is defined by the appended claims rather than the detailed description of the invention. All modifications and changes derived from the scope and spirit of the claims and equivalents thereof should be construed to be included in the scope of the present invention.

What is claimed is:

1. A method of allocating a plurality of secure areas in an insecure area of a storage device, the method comprising:
    allocating a plurality of secure areas of the storage device for storing data to be received within any portion of an insecure area;
    sending position information regarding the secure areas allocated within the insecure area to a host device;
    receiving the position information and data to be stored in the secure areas from a secure application of the host device; and
    encrypting and storing the data in the insecure area based on the position information;
    wherein the allocating of the secure areas comprises:
    receiving information regarding a size of the data from the host device; and
    allocating the secure areas having a sufficient size to store the data in the insecure area, wherein the method further comprises changing the position information using a hash table, and
when receiving a hash value from the host device, the method further comprises confirming an address corresponding to the hash value while referring to the hash table, and extracting data stored at the confirmed address.

2. The method of claim 1, further comprising performing authentication with the secure application of the host device.

3. The method of claim 1, further comprising:
receiving a request to access the data from the secure application of the host device;
extracting the data from the secure areas within the insecure area and decrypting the data; and
sending the decrypted data to the host device.

4. The method of claim 3, wherein the sending of the decrypted data comprises:
encrypting the decrypted data using a predetermined encryption method on which an agreement is made with the secure application of the host device; and
sending the encrypted data to the host device.

5. The method according to claim 1, wherein the secure areas protect the stored data and prevents an unauthorized user or application from accessing or changing the stored data.

6. A method of allocating a plurality of secure areas in an insecure area of a storage device, the method comprising:
allocating a plurality of secure areas of the storage device for storing data to be received within any portion of an insecure area;
receiving data to be stored in the secure areas from a secure application of a host device;
securing the secure areas for storing the data within the insecure area and encrypting and storing the data in the secure areas; and
sending a result of the storing the data to the host device;
wherein the allocating of the secure areas comprises:
receiving information regarding a size of the data from the host device; and
allocating the secure areas having a sufficient size to store the data in the insecure area,
wherein the method further comprises changing the position information using a hash table, and
when receiving a hash value from the host device, the method further comprises confirming an address corresponding to the hash value while referring to the hash table, and extracting data stored at the confirmed address.

7. The method of claim 6, wherein the result of the storing the data comprises position information regarding the secure areas storing the data within the insecure area.

8. The method of claim 6, further comprising performing authentication with the secure application of the host device.

9. The method of claim 6, further comprising:
receiving a request to access the data from the secure application of the host device;
extracting the data from the secure areas within the insecure area and decrypting the data; and
sending the decrypted data to the host device.

10. The method of claim 9, wherein the sending of the decrypted data comprises:
encrypting the decrypted data using a predetermined encryption method on which an agreement is made with the secure application of the host device; and
sending the encrypted data to the host device.

11. A storage device for allocating a plurality of secure areas in an insecure area, the storage device comprising:
a storage section comprising an insecure area and a plurality of secure areas of the storage device, wherein the secure areas for storing data to be received are allocated within any portion of the insecure area;
a transmitter which sends position information regarding the secure areas of the storage section to a host device;
a receiver which receives the position information and data to be stored in the secure areas from the host device; and
a secure application which encrypts and stores the data in the storage section based on the position information;
wherein the secure areas are allocated by:
receiving information regarding a size of the data from the host device; and
allocating the secure areas having a sufficient size to store the data in the insecure area,
wherein the secure application changes the position information using a hash table, and
when receiving a hash value from the host device, the secure application confirms an address corresponding to the hash value while referring to the hash table, and extracts data stored at the confirmed address.

12. The storage device of claim 11, wherein the secure application performs authentication with the host device.

13. The storage device of claim 11, wherein the receiver receives a request to access the data from a secure application included in the host device, the secure application included in the storage device extracts the data from the secure areas within the insecure area and decrypts the data, and the transmitter sends the decrypted data to the host device.

14. The storage device of claim 13, wherein the secure application included in the storage device encrypts the decrypted data using a predetermined encryption method on which an agreement is made with the host device, and the transmitter sends the encrypted data to the host device.

15. The storage device according to claim 11, wherein the secure application includes a table for mapping an address value of the secure areas existing in the insecure area to an address value recognizable by the secure application.

16. A storage device for allocating a plurality of secure areas in an insecure area, the storage device comprising:
a storage section comprising an insecure area and a plurality of secure of the storage device, wherein the secure areas for storing data to be received are allocated within any portion of the insecure area;
a receiver which receives data to be stored in the secure areas of the storage section from a host device;
a secure application which secures a space for the secure areas needed to store the data within the storage section, and encrypts and stores the data in the secure areas; and
a transmitter which sends a result of the storing the data within the storage section to the host device;
wherein the secure areas are allocated by:
receiving information regarding a size of the data from the host device; and
allocating the secure areas having a sufficient size to store the data in the insecure area,
wherein the secure application changes the position information using a hash table, and
when receiving a hash value from the host device, the secure application confirms an address corresponding to the hash value while referring to the hash table, and extracts data stored at the confirmed address.

17. The storage device of claim 16, wherein the result of the storing the data comprises position information regarding the secure areas storing the data within the insecure area.

18. The storage device of claim 16, wherein the secure application performs authentication with the host device.

19. The storage device of claim 16, wherein the receiver receives a request to access the data from the host device, the secure application extracts the data from the secure areas within the insecure area and decrypts the data, and the transmitter sends the decrypted data to the host device.

20. The storage device of claim 19, wherein the secure application encrypts the decrypted data using a predetermined encryption method on which an agreement is made with the host device.

* * * * *